(12) United States Patent
Smith

(10) Patent No.: US 8,319,682 B2
(45) Date of Patent: Nov. 27, 2012

(54) METHOD AND APPARATUS FOR EXAMINING AN OBJECT USING ELECTROMAGNETIC MILLIMETER-WAVE SIGNAL ILLUMINATION

(75) Inventor: Robert A. Smith, Hampton Cove, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/985,452

(22) Filed: Jan. 6, 2011

(65) Prior Publication Data

US 2012/0176265 A1  Jul. 12, 2012

(51) Int. Cl.
  G01S 13/88 (2006.01)
  G01S 7/40 (2006.01)
  G01S 7/41 (2006.01)
  G01S 13/00 (2006.01)
  G01S 7/00 (2006.01)

(52) U.S. Cl. ............... 342/193; 342/21; 342/22; 342/59; 342/82; 342/89; 342/165; 342/173; 342/175; 342/192; 342/195; 342/196

(58) Field of Classification Search .............. 342/21, 342/22, 27, 28, 59, 82–103, 175, 176, 179, 342/192–197, 73, 74, 81, 118, 146, 147, 342/165, 173, 174; 398/43, 74, 75, 115; 455/130, 230, 232.1, 234.1, 249.1; 73/866; 250/336.1, 338.1, 339.01, 339.14
See application file for complete search history.

(56) References Cited

U.S. PATENT DOCUMENTS

| | | | | |
|---|---|---|---|---|
| 5,446,461 A | * | 8/1995 | Frazier | 342/22 |
| 5,835,054 A | * | 11/1998 | Warhus et al. | 342/22 |
| 5,900,833 A | * | 5/1999 | Sunlin et al. | 342/22 |
| 6,384,414 B1 | * | 5/2002 | Fisher et al. | 250/339.14 |
| 6,466,155 B2 | * | 10/2002 | Taylor et al. | 342/22 |
| 6,466,157 B1 | * | 10/2002 | Bjornholt et al. | 342/28 |
| 6,507,309 B2 | * | 1/2003 | McMakin et al. | 342/22 |
| 6,703,964 B2 | * | 3/2004 | McMakin et al. | 342/22 |
| 6,864,825 B2 | | 3/2005 | Holly | |
| 6,919,838 B2 | * | 7/2005 | Santhoff | 342/22 |
| 7,019,682 B1 | * | 3/2006 | Louberg et al. | 342/22 |
| 7,081,817 B2 | * | 7/2006 | Zhevelev et al. | 250/336.1 |
| 7,123,185 B2 | * | 10/2006 | Fleisher et al. | 342/179 |
| 7,142,147 B2 | | 11/2006 | Holly | |
| 7,148,836 B2 | * | 12/2006 | Romero et al. | 342/22 |
| 7,180,441 B2 | * | 2/2007 | Rowe et al. | 342/22 |
| 7,202,808 B2 | * | 4/2007 | Fleisher et al. | 342/22 |
| 7,205,926 B2 | * | 4/2007 | Rowe et al. | 342/22 |
| 7,265,709 B2 | * | 9/2007 | Fleisher et al. | 342/22 |
| 7,385,549 B2 | * | 6/2008 | Lovberg et al. | 342/22 |
| 7,526,970 B2 | * | 5/2009 | Mawer | 73/866 |

(Continued)

*Primary Examiner* — Bernarr Gregory
(74) *Attorney, Agent, or Firm* — Armstrong Teasdale LLP

(57) ABSTRACT

A method examining an object using millimeter-wave signals includes: (a) providing at least two millimeter-wave signal sources; (b) transmitting at least two millimeter-wave signals having at least two different frequencies from the signal sources illuminate the object; (c) in no particular order: (1) determining whether a return reflected signal is above a threshold level; [a] if yes, processing the return signal to identify object shape; [b] if not, processing another return signal; and (2) determining whether a return intermodulation product or harmonic signal is detected; [a] if yes, processing the return signal to identify object nature; [b] if not, processing another return signal; (d) determining whether checked all return signals; (1) if not, processing another return signal; (2) if yes, proceeding to step (e); (e) determining whether results are satisfactory; (1) if not, changing frequency of at least one of the wave signals; (2) if yes, terminating the method.

20 Claims, 3 Drawing Sheets

U.S. PATENT DOCUMENTS

| | | | |
|---|---|---|---|
| 7,528,763 B2 * | 5/2009 | Rowe et al. | 342/22 |
| 7,710,313 B2 * | 5/2010 | Ghaleb et al. | 342/81 |
| 7,782,251 B2 * | 8/2010 | Bishop et al. | 342/179 |
| 7,783,199 B2 * | 8/2010 | Ridgway et al. | 398/115 |
| 7,800,527 B2 * | 9/2010 | Douglass et al. | 342/22 |
| 7,817,082 B2 * | 10/2010 | Dwelly et al. | 342/90 |
| 7,860,473 B2 * | 12/2010 | Hardacker et al. | 455/249.1 |
| 7,889,113 B2 * | 2/2011 | Cardiasmenos et al. | 342/22 |
| 7,948,428 B2 * | 5/2011 | Lovberg et al. | 342/22 |
| 7,973,702 B2 * | 7/2011 | Rofougaran et al. | 342/146 |
| 8,098,185 B2 * | 1/2012 | Ridgway et al. | 342/22 |
| 2005/0231416 A1 * | 10/2005 | Rowe et al. | 342/22 |
| 2008/0112705 A1 * | 5/2008 | Ridgway et al. | 398/74 |
| 2008/0266165 A1 * | 10/2008 | Daly et al. | 342/22 |
| 2009/0189091 A1 | 7/2009 | Holly et al. | |
| 2009/0195435 A1 * | 8/2009 | Kapilevich et al. | 342/22 |

* cited by examiner

METHOD AND APPARATUS FOR EXAMINING AN OBJECT USING ELECTROMAGNETIC MILLIMETER-WAVE SIGNAL ILLUMINATION

TECHNICAL FIELD

The present invention may be directed to examination of objects using electromagnetic wave illumination, and especially to examination of objects using electromagnetic millimeter-wave illumination.

BACKGROUND

Electromagnetic signals have been used before to illuminate objects as a way to identify presence of an object. Such electromagnetic illumination signals have been employed in secure locations such as airports and courthouses to detect objects hidden beneath clothing or within luggage. Detection of strength of signals reflected from an object has been employed to determine presence of the object.

Simply detecting presence of an object may not be enough information about the object in certain circumstances. In the interest of efficiency in processing a large number of persons or luggage such as at an airport, one may wish to avoid detaining and personally electromagnetically "wanding" or physically "pat down" searching individuals for whom an indication of presence of an object under clothing or within luggage has been detected. The term "wanding" refers to a passing of an electromagnetically sensitive wand in the vicinity of an object to detect presence of ferrous materials on or in the object. The term "pat down" refers to a subject of a search being physically contacted by a searcher's hands to check for presence of bulges, hard spots and the like that may indicate a hidden object.

Currently there are applications using millimeter-wave technology for detecting concealed weapons or other threats on individuals or in cargo. It is known that millimeter-waves permit looking through textile or other materials while achieving sufficient resolution to detect critical items or objects. Many known existing systems are passive, and all known existing systems focus on generating images which are viewed by an operator in order to discriminate a critical item or object. For purposes of this disclosure, the term "discriminate" may be taken to mean "detect and identify". Operator interpretation of images that are often grainy or of low resolution may lead to high false alarm rates. Forming images, usually of large areas, requires tens of seconds to minutes to generate so that poor throughput results. Often differing densities of materials detected in an x-ray image can lead to concealment of items of interest. Explosive detection methods such as trace detection, laser spectroscopies and chemical reactions apply to the exterior of a target or object and may not be useful in detecting concealed items.

There is a need for a method and apparatus for examining an object that may permit determination of the shape and nature of an object. For purposes of this disclosure the term "nature" of an object may be taken to refer to the material make up of the object such as, by way of example and not by way of limitation, chemicals, elements or minerals present within the object.

SUMMARY

A method for examining an object using electromagnetic millimeter-wave signal illumination includes: (a) providing at least two electromagnetic millimeter-wave signal sources; (b) transmitting at least two electromagnetic millimeter-wave signals from the at least two wave signal sources to illuminate the object; the at least two wave signals having at least two different frequencies; (c) in no particular order: (1) determining whether a return reflected signal is above a predetermined threshold signal level; [a] if above the threshold signal level, processing the return reflected signal to identify shape of the object; [b] if not above the threshold signal level; processing another return signal; and (2) determining whether a return intermodulation product or harmonic signal is detected; [a] if detected, processing the return intermodulation product or harmonic signal to identify nature of the object; [b] if not detected; processing another return signal; (d) determining whether all return signals have been checked; (1) if have not been checked, processing another return signal; (2) if have been checked, proceeding to step (e); (e) determining whether the method has yielded satisfactory results; (1) if has not yielded satisfactory results, changing frequency of at least one of the at least two wave signals; (2) if has yielded satisfactory results, terminating the method.

An apparatus for examining an object using electromagnetic millimeter-wave signal illumination includes: (a) at least two electromagnetic millimeter-wave signal sources; the at least two electromagnetic millimeter-wave signal sources being oriented with respect to the object to permit illumination of the object by at least two electromagnetic millimeter-wave signals from the at least two electromagnetic millimeter-wave signal sources; the at least two electromagnetic millimeter-wave signals having at least two different frequencies; (b) at least one receiver unit oriented with respect to the object to permit receiving reflected signals of selected electromagnetic millimeter-wave signals of the at least two electromagnetic millimeter-wave signals; (c) an analysis unit coupled with the at least one receiver unit; the analysis unit ascertaining signal level of the reflected signals and intermodulation product or harmonic signals among the reflected signals; shape of the object being indicated when the reflected signals are above a predetermined threshold signal level; nature of the object being indicated by the intermodulation product or harmonic signals.

It is, therefore, a feature of the present disclosure to provide a method and apparatus for examining an object that may permit determination of the shape and nature of an object.

Further objects and features of the present disclosure will be apparent from the following specification and claims when considered in connection with the accompanying drawings, in which like elements may be labeled using like reference numerals in the various figures, illustrating the preferred embodiments of the disclosure.

DETAILED DESCRIPTION

Figure 1:
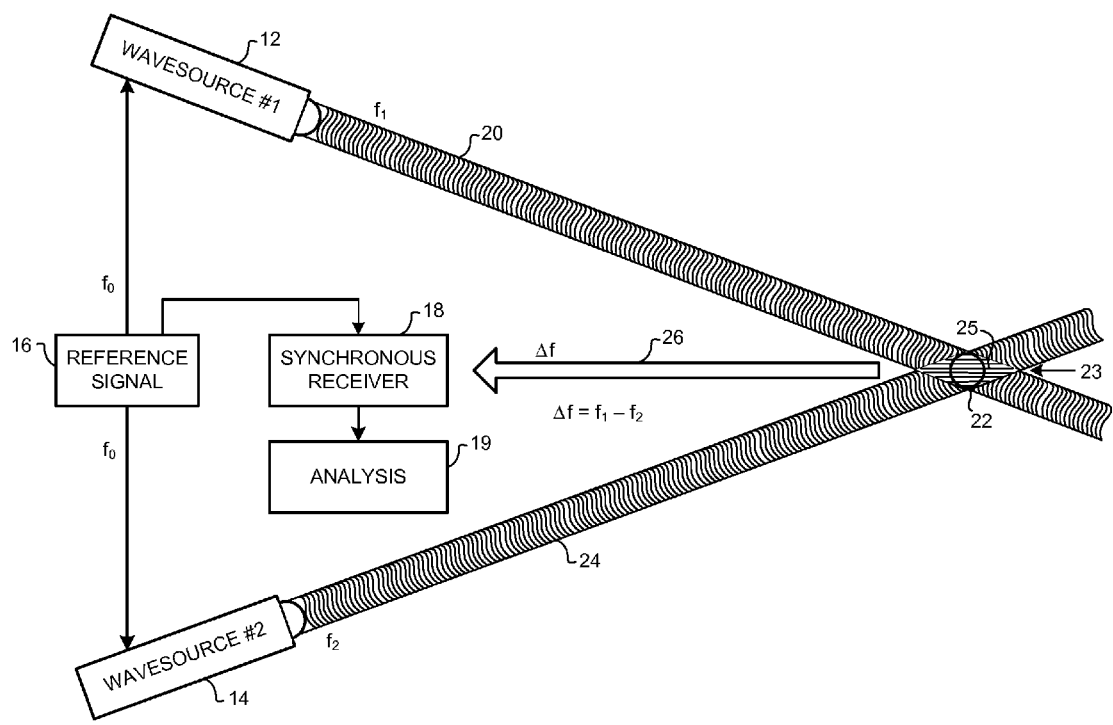
FIG. 1 is a schematic diagram of a first embodiment of the apparatus of the present disclosure.

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

The present disclosure describes a method and apparatus capable of metal detection, bulk explosive detection and non-metallic concealed weapon detection resulting from radiometric measurement of scattered energy from components illuminated by transmitted millimeter-wave signals. A threshold level detection maybe performed to discriminate different density items which may be concealed. Electronic component and other dissimilar metal junction detection may be effected using nonlinear responses or intermodulation product signal generation from objects illuminated by a difference frequency interrogation. Metal detection, bulk explosive detection and non-metallic concealed weapon detection may result from scanning and generating an image of scattered energy from objects illuminated by transmitted millimeter-wave signals. An image of a target area may be presented to an operator for interpretation of results. Automated detection may be effected using information from threshold signal detection and difference signal detection modes of operation. Focused illumination of an object and operation at low power levels may mitigate interference during operation. Operating in a continuous wave mode may permit rapid detection and confirmation of presence of objects with a capacity of hundreds of measurements per second. Implementation may be conducted using frequencies ranging from about 30 GHz (GigaHertz) to about 300 GHz. A most effective employment may be within the W-Band (75 to 110 GHz).

FIG. 1 is a schematic diagram of a first embodiment of the apparatus of the present disclosure. In FIG. 1, an apparatus 10 may include a first electromagnetic millimeter-wave signal source 12 and a second electromagnetic millimeter-wave signal source 14 coupled with a common reference signal generator unit 16. Reference signal generator unit 16 may be coupled with a synchronous receiver unit 18. An analysis unit 19 may be coupled with synchronous receiver unit 18.

First electromagnetic millimeter-wave signal source 12 may synthesize (from a reference signal $f_0$ provided by reference signal generator unit 16) a first electromagnetic millimeter-wave signal 20 having a frequency $f_1$. First electromagnetic millimeter-wave signal source 12 may transmit first electromagnetic millimeter-wave signal 20 to illuminate an object 22.

Second electromagnetic millimeter-wave signal source 14 may synthesize (from a reference signal $f_0$ provided by reference signal generator unit 16) a second electromagnetic millimeter-wave signal 24 having a frequency $f_2$. Second electromagnetic millimeter-wave signal source 14 may transmit second electromagnetic millimeter-wave signal 24 to illuminate object 22.

Either of electromagnetic millimeter-wave signals 20, 24 may be reflected from object 22 and received by synchronous receiver unit 18. This phenomenon is understood by those skilled in the art of electromagnetic wave propagation systems and is not illustrated in FIG. 1 in order to avoid cluttering FIG. 1. In addition, a difference signal 26 having a frequency $\Delta f$ may be reflected from object 22 and received by synchronous receiver unit 18. Frequency $\Delta f$ may be related with frequencies $f_1$, $f_2$ by the relation, $$\Delta f = f_1 - f_2 \quad [1]$$

Intersecting electromagnetic millimeter-wave signals 20, 24 in a vicinity 23 of object 22 may establish fringe planes 25 substantially perpendicular to the plane containing FIG. 1.

Analysis unit 19 may ascertain signal level of reflected electromagnetic millimeter-wave signals 20, 24 to determine whether either of reflected electromagnetic millimeter-wave signals 20, 24 is above a predetermined threshold signal level. Shape of object 22 may be determined by analysis unit 19 using information gleaned from received signal levels of reflected electromagnetic millimeter-wave signals 20, 24. The relatively shorter wavelength of reflected electromagnetic millimeter-wave signals 20, 24 in comparison with the longer wavelength signals used in prior art electromagnetic illumination signal systems may permit finer resolution of shape of object 22 than may have been achieved by such prior art systems.

Analysis unit 19 may ascertain reflected difference signal 26 to ascertain presence of object 22. Analysis unit 19 may employ information from both reflected electromagnetic millimeter-wave signals 20, 24 and reflected difference signal 26 to ascertain presence of object 22.

Figure 2:
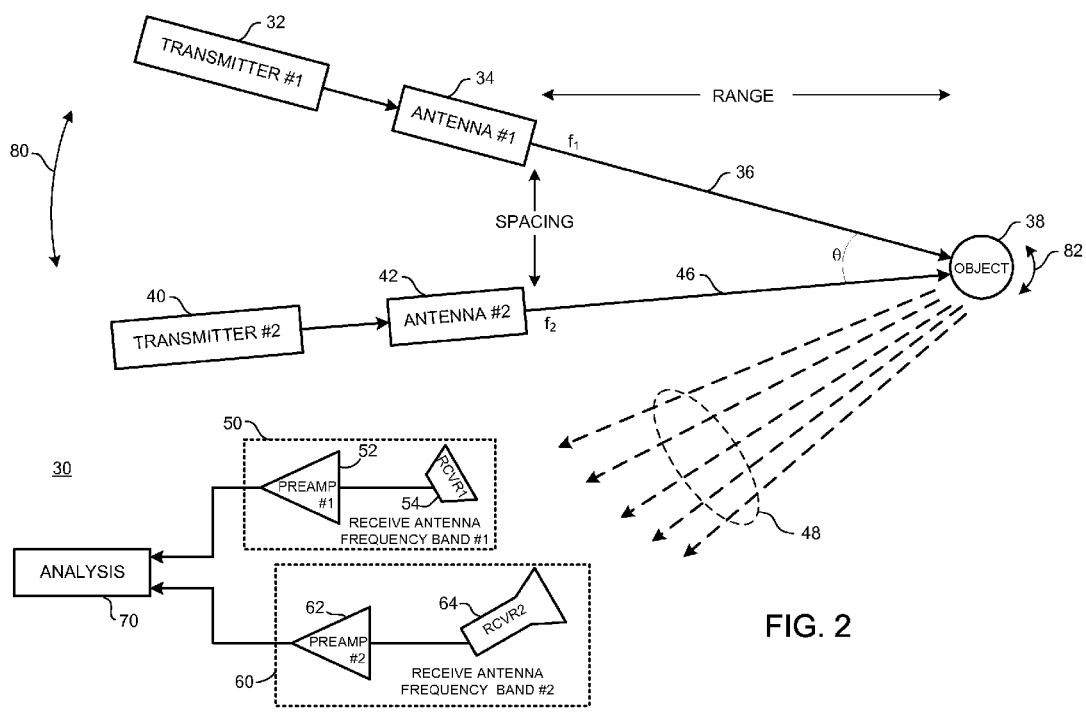
FIG. 2 is a schematic diagram of a second embodiment of the apparatus of the present disclosure.

FIG. 2 is a schematic diagram of a second embodiment of the apparatus of the present disclosure. In FIG. 2, an apparatus 30 may include a first millimeter-wave transmitter 32 coupled with a first transmitting antenna 34 cooperating with first millimeter-wave transmitter 32 to transmit a first electromagnetic millimeter-wave signal 36 to illuminate an object 38. Apparatus 30 may also include a second millimeter-wave transmitter 40 coupled with a second transmitting antenna 42 cooperating with second millimeter-wave transmitter 40 to transmit a first electromagnetic millimeter-wave signal 46 to illuminate object 38.

Orientation of the various elements of apparatus 30 may be defined by employing the range of antennas 34, 42 from object 38 and the spacing between antennas 34, 42. Spacing between antennas 34, 42 may be expressed in terms of a convergence angle $\Theta$ between electromagnetic millimeter-wave signals 36, 46. Convergence angle $\Theta$ could be zero and signals at frequencies $f_1$, $f_2$ could be transmitted from a single antenna.

Scattered return signals 48 may be reflected from object 38. A first antenna unit 50 may receive scattered return signals 48 in a first frequency band. First antenna unit 50 may include a first preamplifier unit 52 coupled with a first receiver unit 54. A second antenna unit 60 may receive scattered return signals 48 in a second frequency band. Second antenna unit 60 may include a second preamplifier unit 62 coupled with a second receiver unit 64. By way of example and not by way of limitation, the first frequency band may be the W-Band and the second frequency band may be in the UHF to X Band range.

Antenna units 50, 60 may be coupled with an analysis unit 70. Scattered return signals 48 may be embodied in intermodulation product signals or harmonic signals. Analysis unit 70 may ascertain scattered return signals 48 to ascertain nature of object 22. Empirical or other data may be stored data in analysis unit 70 or elsewhere available to analysis unit 70 to permit analysis unit 70 to compare information gleaned from scattered return signals 48 with the collected stored data to determine nature of object 48 or portions of object 38. By way of example and not by way of limitation, nature of object 38 or portions of object 38 that may be distinguished may include non-linear electrical junctions, certain electronics elements, dissimilar electrical junctions, presence of dielectrics, liquids, non-metallic materials, ceramic materials and other characteristics or elements.

Apparatus 30 may be altered in its orientation with respect to object 38 by a scanning operation effectively moving apparatus 30 as indicated by arrows 80 in FIG. 2. Such a scanning operation may be effected by physically or mechanically moving apparatus 30 or by employing a beam or signal steering operation known to those skilled in the art of electronic beam scanning. Additionally or alternately, object 38 may be rotated as indicated by arrows 82 in FIG. 2 to present a different aspect of object 38 to apparatus 38. A combination of scanning by apparatus 30 and movement of object 38 may also be employed to effect presenting a different aspect of object 38 to apparatus 30.

Figure 3:
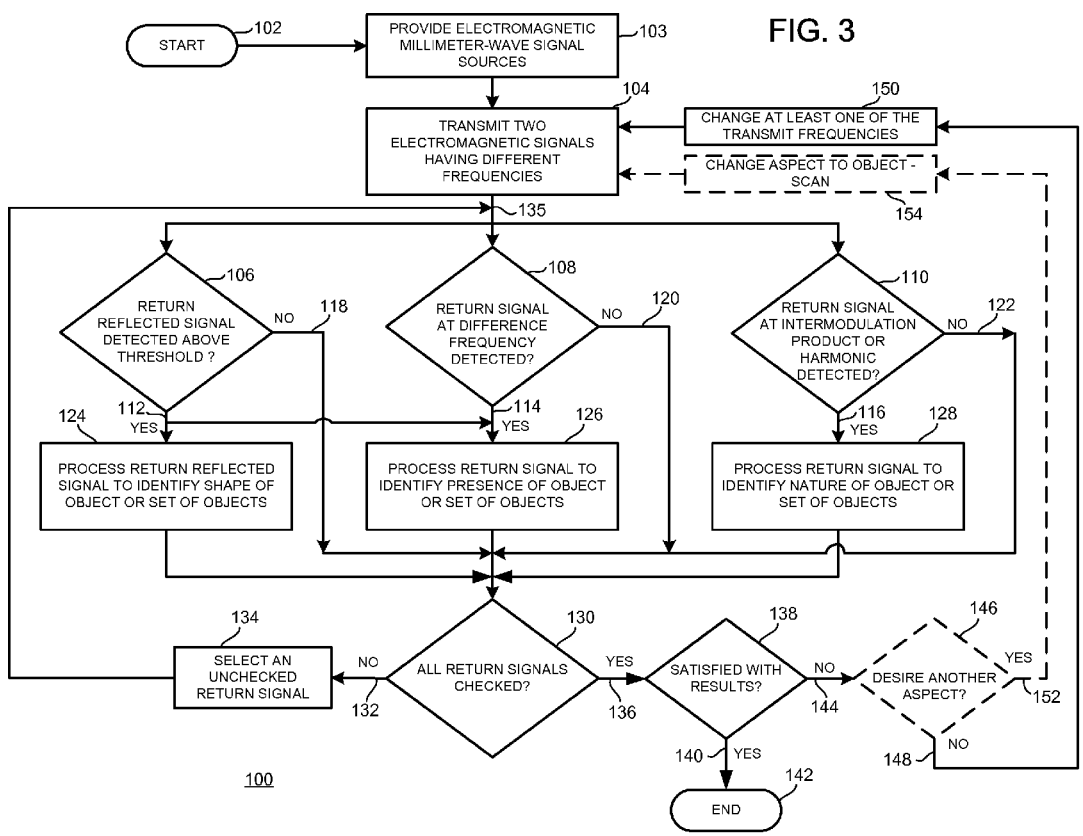
FIG. 3 is a flow chart illustrating the method of the present disclosure.

FIG. 3 is a flow chart illustrating the method of the present disclosure. In FIG. 3, a method 100 for examining an object using electromagnetic millimeter-wave signal illumination may begin at a START locus 102. Method 100 may continue with providing at least two electromagnetic millimeter-wave signal sources, as indicated by a block 103.

Method 100 may continue with transmitting at least two electromagnetic millimeter-wave signals from the at least two electromagnetic millimeter-wave signal sources to illuminate the object, as indicated by a block 104. The at least two electromagnetic millimeter-wave signals may have at least two different frequencies.

Method 100 may continue with, in no particular order:
(1) Determining whether a return reflected signal from the object is above a predetermined threshold signal level, as indicated by a query block 106. If the return reflected signal is above the predetermined threshold signal level, method 100 may proceed from query block 106 via a YES response line 112 and may process the return reflected signal to identify shape of the object, as indicated by a block 124. Method 100 may also employ a detected reflected signal to contribute to identifying presence of the object, as indicated by a block 126. If the return reflected signal is not above the predetermined threshold signal level method 100 may proceed from query block 106 via a NO response line 118 and may proceed to a query block 130 to pose a query whether all return signals have been checked.
(2) Determining whether a return difference signal reflected from the object is detected, as indicated by a query block 108. If a return difference signal is detected, method 100 may proceed from query block 108 via a YES response line 114 and may process the return difference reflected signal to identify presence of the object, as indicated by a block 126. If a return difference reflected signal is not detected, method 100 may proceed from query block 108 via a NO response line 120 and may proceed to a query block 130 to pose a query whether all return signals have been checked.
(3) Determining whether a return intermodulation product or harmonic signal from the object is detected, as indicated by a query block 110. If a return intermodulation product or harmonic signal is detected, method 100 may proceed from query block 110 via a YES response line 116 and may process the return intermodulation product or harmonic signal to identify nature of the object, as indicated by a block 128. If a return intermodulation product or harmonic signal is not detected, method 100 may proceed from query block 110 via a NO response line 122 and may proceed to a query block 130 to pose a query whether all return signals have been checked.

After completion of steps indicated by blocks 124, 126, 128 or after a NO response to queries posed by query blocks 106, 108, 110, method 100 may continue with determining whether all return signals have been checked as indicated by query block 130. If all return signals have not been checked, method 100 may proceed from query block 130 via a NO response line 132 to select an unchecked return signal, as indicated by a block 134. Method 100 may proceed from block 134 to a locus 135 and thereafter carry out steps described above in connection with blocks 106, 108, 110, 124, 126, 128, 130 to effect processing another return signal.

If all return signals have been checked, method 100 may proceed from query block 130 via a YES response line 136 to pose a query whether a user is satisfied with the results of method 100, as indicated by a query block 138. If satisfied with the results, method 100 may proceed from query block 138 via a YES response line 140 to terminate method 100 as indicated by an END locus 142. If not satisfied with the results, method 100 may proceed from query block 138 via a NO response line 144. An optional query may be posed as indicated by a broken-line query block 146 whether another aspect of the object is desired. If another aspect of the object is desired, method 100 may proceed from query block 146 via a YES response line 152 and aspect of the object may be changed, as indicated by a block 154. Aspect of the object may be changed by mechanical scanning or electrical signal scanning of the object, by physically moving the object such as by rotating the object, or by a combination of scanning and rotating the object. If another aspect of the object is desired, method 100 may proceed from query block 146 via a NO response line 152 and at least one of the transmit frequencies of the at least two electromagnetic signals transmitted pursuant to block 104 may be changed, as indicated by a block 150.

After completion of an action indicated by either of blocks 150, 154, method 100 may carry out steps described above in connection with blocks 104, 106, 108, 110, 124, 126, 128, 130 to effect processing another return signal.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claim:

I claim:

1. A method for examining an object using electromagnetic millimeter-wave signal illumination; the method comprising:
   (a) providing at least two electromagnetic millimeter-wave signal sources;
   (b) transmitting at least two electromagnetic millimeter-wave signals from said at least two electromagnetic millimeter-wave signal sources to illuminate said object; said at least two electromagnetic millimeter-wave signals having at least two different frequencies;

(c) in no particular order:
  (1) determining whether a return reflected signal from said object is above a predetermined threshold signal level;
    [a] if said return reflected signal is above said predetermined threshold signal level, processing said return reflected signal to identify shape of said object;
    [b] if said return reflected signal is not above said predetermined threshold signal level; processing another return signal; and
  (2) determining whether a return intermodulation product or harmonic signal from said object is detected;
    [a] if said return intermodulation product or harmonic signal is detected, processing said return intermodulation product or harmonic signal to identify nature of said object;
    [b] if said return intermodulation product or harmonic signal is not detected; processing another return signal;
(d) determining whether all return signals have been checked;
  (1) if all return signals have not been checked, processing another return signal;
  (2) if all return signals have been checked, proceeding to step (e);
(e) determining whether the method has yielded satisfactory results;
  (1) if the method has not yielded satisfactory results, changing frequency of at least one of said at least two electromagnetic millimeter-wave signals and repeating steps (b) through (e);
  (2) if the method has yielded satisfactory results, terminating the method.

2. The method for examining an object using electromagnetic millimeter-wave signal illumination as recited in claim 1 wherein the method further comprises:
  replacing step (e)(1) with: if the method has not yielded satisfactory results, posing a query whether another aspect of said object is desired;
    [a] if another aspect of the object is desired, changing aspect to the object by effecting at least one of:
      [1] scanning said at least two electromagnetic millimeter-wave signals to a different aspect angle to said object;
      [2] moving said object to present a different aspect to said at least two electromagnetic millimeter-wave signal sources; and
      [3] repeating steps (b) through (e); and
    [b] if another aspect of said object is not desired, changing frequency of at least one of said at least two electromagnetic millimeter-wave signals and repeating steps (b) through (e).

3. The method for examining an object using electromagnetic millimeter-wave signal illumination as recited in claim 2 wherein said object is comprised of a plurality of object-units located substantially at a single locus.

4. The method for examining an object using electromagnetic millimeter-wave signal illumination as recited in claim 2 wherein said scanning is effected substantially by mechanical relocation of said at least two electromagnetic millimeter-wave signal sources with respect to said object.

5. The method for examining an object using electromagnetic millimeter-wave signal illumination as recited in claim 2 wherein said scanning is carried out substantially by electronic signal steering to effect reorientation of said at least two electromagnetic millimeter-wave signals with respect to said object.

6. The method for examining an object using electromagnetic millimeter-wave signal illumination as recited in claim 1 wherein said object is comprised of a plurality of object-units located substantially at a single locus.

7. The method for examining an object using electromagnetic millimeter-wave signal illumination as recited in claim 6 wherein said scanning is effected substantially by mechanical relocation of said at least two electromagnetic millimeter-wave signal sources with respect to said object.

8. The method for examining an object using electromagnetic millimeter-wave signal illumination as recited in claim 6 wherein said scanning is carried out substantially by electronic signal steering to effect reorientation of said at least two electromagnetic millimeter-wave signals with respect to said object.

9. A method for examining an object using electromagnetic millimeter-wave signal illumination; the method comprising:
  (a) providing at least two electromagnetic millimeter-wave signal sources;
  (b) transmitting at least two electromagnetic millimeter-wave signals from said at least two electromagnetic millimeter-wave signal sources to illuminate said object; said at least two electromagnetic millimeter-wave signals having at least two different frequencies;
  (c) substantially simultaneously:
    (1) determining whether a return reflected signal from said object is above a predetermined threshold signal level;
      [a] if said return reflected signal is above said predetermined threshold signal level, processing said return reflected signal to identify shape of said object;
      [b] if said return reflected signal is not above said predetermined threshold signal level; processing another return signal; and
    (2) determining whether a return intermodulation product or harmonic signal from said object is detected;
      [a] if said return intermodulation product or harmonic signal is detected, processing said return intermodulation product or harmonic signal to identify nature of said object;
      [b] if said return intermodulation product or harmonic signal is not detected; processing another return signal;
  (d) determining whether all return signals have been checked;
    (1) if all return signals have not been checked, processing another return signal;
    (2) if all return signals have been checked, proceeding to step
  (e) determining whether the method has yielded satisfactory results;
    (1) if the method has not yielded satisfactory results, changing frequency of at least one of said at least two electromagnetic millimeter-wave signals and repeating steps (b) through (e);
    (2) if the method has yielded satisfactory results, terminating the method.

10. The method for examining an object using electromagnetic millimeter-wave signal illumination as recited in claim 9 wherein the method further comprises:
  replacing step (e)(1) with: if the method has not yielded satisfactory results, posing a query whether another aspect of said object is desired;

[a] if another aspect of the object is desired, changing aspect to the object by effecting at least one of:
  [1] scanning said at least two electromagnetic millimeter-wave signals to a different aspect angle to said object;
  [2] moving said object to present a different aspect to said at least two electromagnetic millimeter-wave signal sources; and
  [3] repeating steps (b) through (e); and
[b] if another aspect of said object is not desired, changing frequency of at least one of said at least two electromagnetic millimeter-wave signals and repeating steps (b) through (e).

11. The method for examining an object using electromagnetic millimeter-wave signal illumination as recited in claim 10 wherein said object is comprised of a plurality of object-units located substantially at a single locus.

12. The method for examining an object using electromagnetic millimeter-wave signal illumination as recited in claim 10 wherein said scanning is effected substantially by mechanical relocation of said at least two electromagnetic millimeter-wave signal sources with respect to said object.

13. The method for examining an object using electromagnetic millimeter-wave signal illumination as recited in claim 10 wherein said scanning is carried out substantially by electronic signal steering to effect reorientation of said at least two electromagnetic millimeter-wave signals with respect to said object.

14. The method for examining an object using electromagnetic millimeter-wave signal illumination as recited in claim 9 wherein said object is comprised of a plurality of object-units located substantially at a single locus.

15. The method for examining an object using electromagnetic millimeter-wave signal illumination as recited in claim 14 wherein said scanning is effected substantially by mechanical relocation of said at least two electromagnetic millimeter-wave signal sources with respect to said object.

16. The method for examining an object using electromagnetic millimeter-wave signal illumination as recited in claim 14 wherein said scanning is carried out substantially by electronic signal steering to effect reorientation of said at least two electromagnetic millimeter-wave signals with respect to said object.

17. An apparatus for examining an object using electromagnetic millimeter-wave signal illumination; the apparatus comprising:

(a) at least two electromagnetic millimeter-wave signal sources; said at least two electromagnetic millimeter-wave signal sources being oriented with respect to said object to permit illumination of said object by at least two electromagnetic millimeter-wave signals from said at least two electromagnetic millimeter-wave signal sources; said at least two electromagnetic millimeter-wave signals having at least two different frequencies;

(b) at least one receiver unit oriented with respect to said object to permit receiving reflected signals of selected electromagnetic millimeter-wave signals of said at least two electromagnetic millimeter-wave signals;

(c) an analysis unit coupled with said at least one receiver unit; said analysis unit ascertaining signal level of said reflected signals and intermodulation product or harmonic signals among said reflected signals;

said analysis unit configured to indicate a shape of said object when said reflected signals received by said at least one receiver unit are above a predetermined threshold signal level; said analysis unit configured to indicate a nature of said object based at least in part on said intermodulation product or harmonic signals.

18. The apparatus for examining an object using electromagnetic millimeter-wave signal illumination as recited in claim 17 wherein at least one of said object and said at least two electromagnetic millimeter-wave signal sources is configured for reorientation to present a different aspect of said object to said at least two electromagnetic millimeter-wave signal sources.

19. The apparatus for examining an object using electromagnetic millimeter-wave signal illumination as recited in claim 18 wherein said reorientation by said at least two electromagnetic millimeter-wave signal sources is carried out by physically moving at least one of said at least two electromagnetic millimeter-wave signal sources to effect scanning of said object by selected of said at least two electromagnetic millimeter-wave signals.

20. The apparatus for examining an object using electromagnetic millimeter-wave signal illumination as recited in claim 18 wherein said reorientation by said at least two electromagnetic millimeter-wave signal sources is carried out by electronic signal steering of at least one of said at least two electromagnetic millimeter-wave signal sources to effect scanning of said object by selected of said at least two electromagnetic millimeter-wave signals.

* * * * *